(12) United States Patent
Long et al.

(10) Patent No.: US 9,866,171 B2
(45) Date of Patent: Jan. 9, 2018

(54) MEASURING DEVICE FOR PROPERTY OF PHOTOVOLTAIC DEVICE AND MEASURING METHOD USING THE SAME

(71) Applicant: INDUSTRIAL TECHNOLOGY RESEARCH INSTITUTE, Hsinchu (TW)

(72) Inventors: Yean-San Long, Hsinchu (TW); Shu-Tsung Hsu, Hsinchu (TW); Teng-Chun Wu, Jinning Township, Kinmen County (TW); Min-An Tsai, Baozhong Township, Yunlin County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 97 days.

(21) Appl. No.: 14/965,893

(22) Filed: Dec. 10, 2015

(65) Prior Publication Data
US 2017/0104448 A1    Apr. 13, 2017

(30) Foreign Application Priority Data

Oct. 13, 2015  (TW) .............................. 104133486 A
Nov. 9, 2015   (CN) .......................... 2015 1 0756004

(51) Int. Cl.
*G01R 31/00*    (2006.01)
*H02S 50/15*    (2014.01)

(52) U.S. Cl.
CPC .................................... *H02S 50/15* (2014.12)

(58) Field of Classification Search
CPC ............ G01R 31/31924; G01R 1/0483; G01R 1/06794; G01R 31/2601; G01R 31/2893
See application file for complete search history.

(56) References Cited

U.S. PATENT DOCUMENTS

| | | | |
|---|---|---|---|
| 2,690,537 A | 9/1954 | Weiss et al. | |
| 4,129,823 A | 12/1978 | van der Pool et al. | |
| 4,163,194 A | 7/1979 | Ross | |
| 4,205,265 A | 5/1980 | Staebler | |

(Continued)

FOREIGN PATENT DOCUMENTS

| | | |
|---|---|---|
| CN | 2554658 Y | 6/2003 |
| CN | 101949508 A | 1/2011 |

(Continued)

OTHER PUBLICATIONS

Kuang-Han Ke et al., "Definition, Classification and Inspection Methods of Cracks in Photovoltaic Cell—Cracks Induced by Vibration Caused by Transportation".

(Continued)

*Primary Examiner* — Tung X Nguyen
(74) *Attorney, Agent, or Firm* — Rabin & Berdo, P.C.

(57) ABSTRACT

A measuring device for the property of a photovoltaic device and a measuring method using the same are provided. The measuring device includes several light sources and a feedback control module. The light color of each light source is different and includes several light-emitting elements symmetrically configured. The feedback control module is used for controlling illuminations of the light-emitting elements for measuring the property of a photovoltaic device.

16 Claims, 7 Drawing Sheets

(56) References Cited

U.S. PATENT DOCUMENTS

| | | | |
|---|---|---|---|
| 4,924,096 A * | 5/1990 | Mroczkowski | G01R 31/2656 |
| | | | 250/338.1 |
| 5,581,158 A | 12/1996 | Quazi | |
| 5,945,839 A | 8/1999 | Hyvarinen | |
| 6,946,858 B2 | 9/2005 | Matsuyama | |
| 7,030,987 B2 | 4/2006 | Lutz et al. | |
| 7,411,408 B2 | 8/2008 | Shimotomai et al. | |
| 7,528,615 B2 | 5/2009 | Shimotomai | |
| 7,696,461 B2 | 4/2010 | Sinton et al. | |
| 7,719,209 B2 | 5/2010 | Hayes | |
| 7,989,729 B1 | 8/2011 | Zhao et al. | |
| 8,224,598 B2 | 7/2012 | Wu et al. | |
| 8,378,706 B2 | 2/2013 | Kinyon et al. | |
| 2003/0059966 A1 * | 3/2003 | Ellison | G01R 31/311 |
| | | | 438/17 |
| 2004/0020529 A1 | 2/2004 | Schutt et al. | |
| 2011/0025839 A1 | 2/2011 | Trupke et al. | |
| 2011/0301892 A1 * | 12/2011 | Kamieniecki | G01R 31/2656 |
| | | | 702/65 |
| 2012/0248335 A1 | 10/2012 | Kim et al. | |

FOREIGN PATENT DOCUMENTS

| | | |
|---|---|---|
| CN | 102238770 A | 11/2011 |
| CN | 102253046 A | 11/2011 |
| CN | 102575987 A | 7/2012 |
| CN | 102621073 A | 8/2012 |
| CN | 202837487 U | 3/2013 |
| CN | 104486893 A | 4/2015 |
| CN | 102830364 B | 9/2015 |
| JP | 5328041 B2 | 10/2013 |
| TW | I257537 B | 7/2006 |
| TW | I322871 B | 4/2010 |
| TW | 201108445 A | 3/2011 |
| TW | 201229471 A | 7/2012 |
| TW | I397708 B | 6/2013 |
| TW | I414764 B | 11/2013 |
| TW | I417529 B | 12/2013 |

OTHER PUBLICATIONS

J. Electrochem. Soc., vol. 137, No. 11, © The Electrochemical Society, Inc., pp. 3626-3632 Nov. 1990.
Takashi Fuyuki et al., "Photographic surveying of minority carrier diffusion length in polycrystalline silicon solar cells by electroluminescence", Applied Physics Letters 86, 262108 2005.
"Standard Test Method for Spectral Responsivity Measurements of Photovoltaic Devices".
"Measurement of spectral responsivity of a photovoltaic (PV) device", IEC 60904-8:2014.
"Discussion of photovoltaic module I-V characteristics of the test technology".
"Test Method for Current-Voltage (I-V) Performance Measurement of Organic Photovoltaic (OPV) and Dye-Sensitized Solar Cell (DSSC)", SEMI PV57-1214, Nov. 11, 2014.
"Test Method for Spectrum Response (SR) Measurement of Organic Photovoltaic (OPV) and Dye-Sensitized Solar Cell (DSSC)", SEMI PV69-1015, Aug. 31, 2015.
Taiwanese Office Action dated May 9, 2016.

* cited by examiner

MEASURING DEVICE FOR PROPERTY OF PHOTOVOLTAIC DEVICE AND MEASURING METHOD USING THE SAME

This application claims the benefit of Taiwan application Serial No. 104133486, filed Oct. 13, 2015, and the benefit of People's Republic of China application Serial No. 201510756004.7, filed Nov. 9, 2015, the disclosures of which are incorporated by reference herein in its entirety.

TECHNICAL FIELD

The disclosure relates in general to a measuring device and measuring method using the same, and more particularly to a measuring device for a property of a photovoltaic device and measuring method using the same.

BACKGROUND

A photovoltaic device may convert electromagnetic radiation into electricity. To provide suitable electricity to the photovoltaic device for obtaining a corresponding illumination and/or color temperature of light, a property of the photovoltaic device must be grasped before the photovoltaic device is used.

Therefore, it has become a prominent task for the industries to obtain an accurate property curve of the photovoltaic device.

SUMMARY

According to one embodiment, a measuring device for a property of a photovoltaic device is provided. The measuring device includes plural kinds of light sources, a feedback controlling module and a measurement unit. Each light source has different light color, wherein each kind of light source comprises a plurality of light-emitting components symmetrically arranged. The feedback controlling module is configured to control illumination of light emitted by the light sources and determine whether instability of the illumination is less than a first predetermined ratio. If the instability of the illumination is less than the first predetermined ratio, the measurement unit measures the property of the photovoltaic device under the illumination.

According to another embodiment, a measuring method using a measuring device is provided. The measuring method includes the following steps. A measuring device is provided, wherein the measuring device includes plural kinds light sources, a feedback controlling module and a measurement unit; illumination of light emitted by the light sources is controlled by the feedback controlling module; whether the instability of the illumination is less than a first predetermined ratio is determined; and if the instability is less than the first predetermined ratio, the measurement unit measures the property of the photovoltaic device under the illumination.

The above and other aspects of the disclosure will become better understood with regard to the following detailed description of the preferred but non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
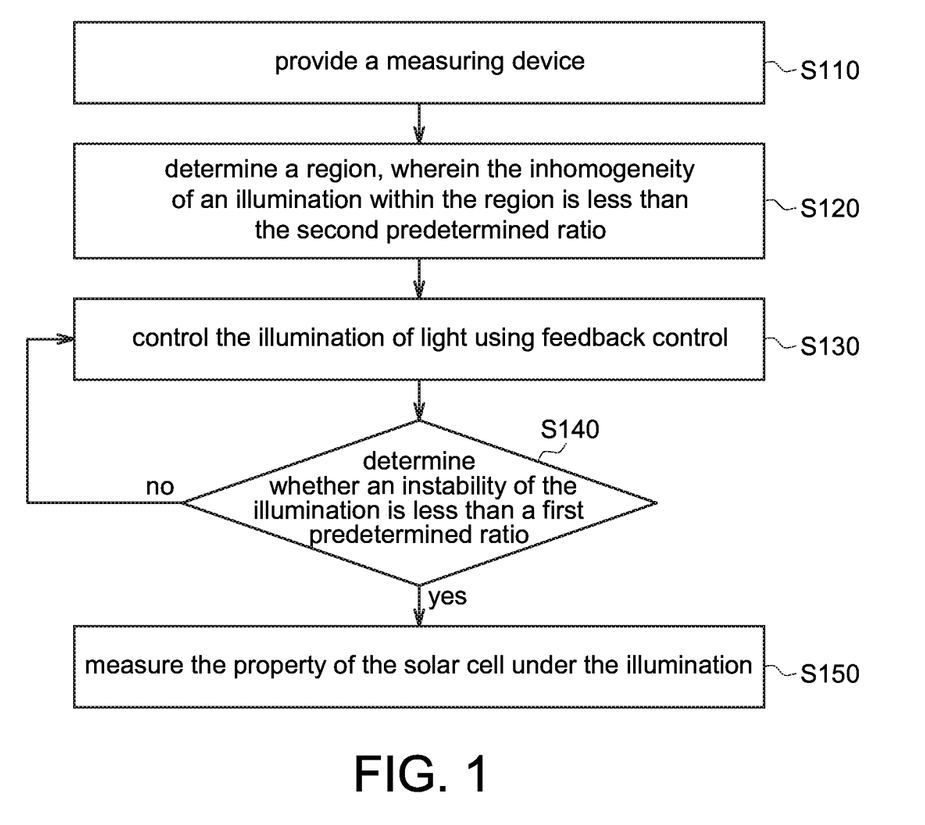
FIG. 1 is a flowchart of a measuring method according to an embodiment of the present disclosure.

FIG. 1 is a flowchart of a measuring method according to an embodiment of the present disclosure.

In step S110, a machining device 100 is provided.

Figure 2:
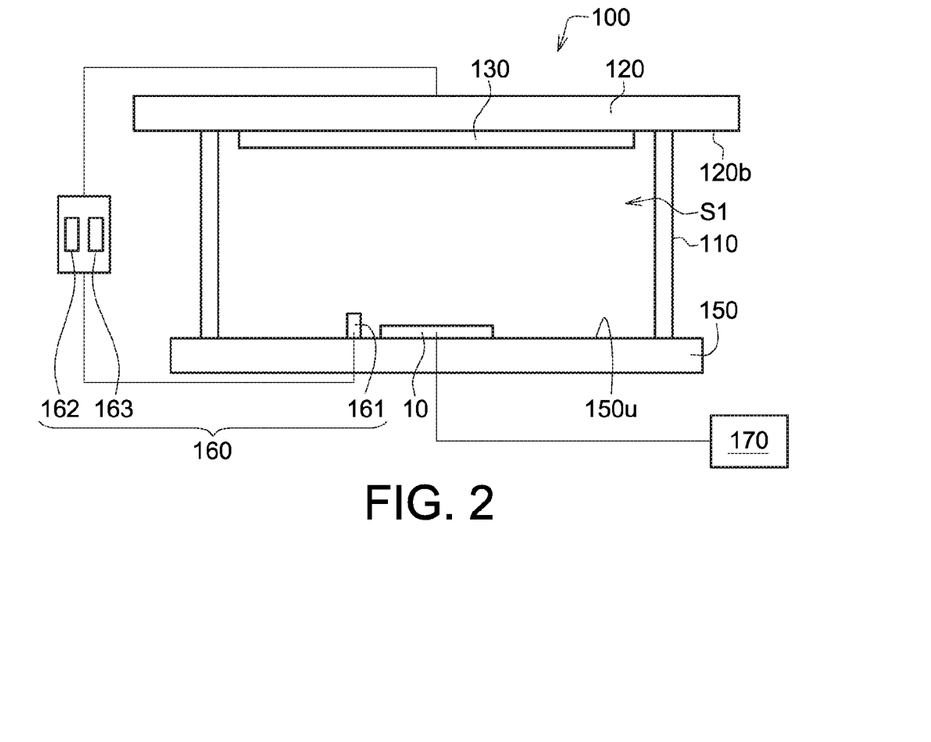
FIG. 2 is a diagram of the measuring device according to an embodiment of the present disclosure.
Figure 3:
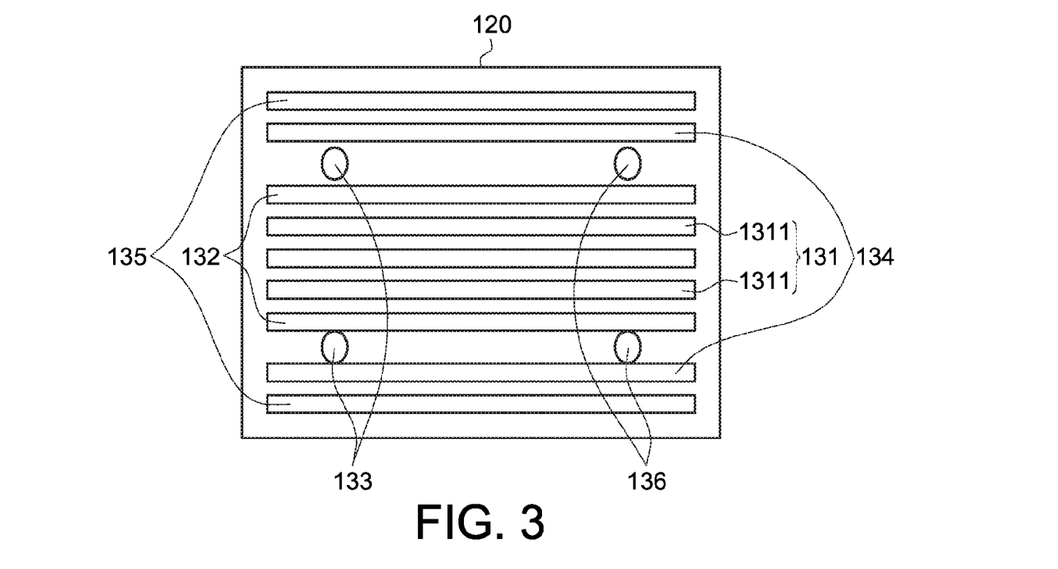
FIG. 3 is a bottom view of a lamp house and a plurality of light sources of FIG. 2.

FIG. 2 is a diagram of the measuring device 100 according to an embodiment of the present disclosure, and FIG. 3 is a bottom view of a lamp house 120 and a plurality of light sources 130 of FIG. 2. The measuring device 100 comprises an accommodating portion 110, the lamp house 120, the light sources 130, a light source 140, a carrier 150, a feedback controlling module 160 and a measurement unit 170.

The machining device 100 is configured to a property of a photovoltaic device 10. The photovoltaic device 10 is disposed on an upper surface 150$u$ of the carrier 150. The photovoltaic device 10 is electrically connected to the measurement unit 170. The measurement unit 170 may measure various properties of the photovoltaic device 10, such as a property curve of voltage and current, a property curve of illumination and short circuit current (Isc), a property curve of temperature and fill factor (FF) or other property. In an embodiment, the measurement unit 170 may be a source measurement unit (SMU), for example. The photovoltaic device may include a solar cell, such as organic photovoltaic (OPV) solar cell, dye-sensitized solar cell (DSSC), etc.

The accommodating portion 110 is disposed between the lamp house 120 and the carrier 150. The accommodating portion 110, the lamp house 120 and the carrier 150 form a close space S1, wherein the light source 130 may be disposed within the close space S1 for reducing or even avoid light leak emitted by the light sources 130. In an embodiment, the accommodating portion 110 may be shaped into close-shape, and the cross-section of the accommodating portion 110 may be circle, polygon or other shape.

The lamp house 120 may be controlled by the feedback controlling module 160, such that the light sources 130 disposed on the lamp house 120 may be controlled by the feedback controlling module 160.

The light sources 130 are disposed a bottom surface 120b of the lamp house 120. Each light source 130 may be a standard light source applied to indoor or outdoor, such as ISO/CIE 8995-1 formulated by International Commission on Illumination, light source formulated by Illuminating Engineering Society of North America (IESNA), EN 12464-1 formulated by UK, prEN 12464-1 formulated by Germany, JIS Z0125-2007 formulated by Japan, SS531-2006 formulated by Singapore, AS/NZS 1680-2006 formulated by Australia, ASHARE90.1-2007 formulated by US, etc. In detail, each light source 130 may be D65 light source (may simulate blue sky sunlight) capture of emitting light having color temperature of 6500K, D75 light source (may simulate average sunlight in North) capture of emitting light having color temperature of 7500K, D50 light source (may simulate nature sunlight) capture of emitting light having color temperature of 5000K, TL84 light source (may simulate store illumination in Europe) capture of emitting light having color temperature of 4000K, D65 light source (may simulate blue sky sunlight) capture of emitting light having color temperature of 4100K, CWF light source (may simulate store illumination in US) capture of emitting light having color temperature of 6500K, U30 light source (may simulate another kind of store illumination in US) capture of emitting light having color temperature of 3000K, U35 light source (may simulate designed store illumination) capture of emitting light having color temperature of 3500K, F light source (may simulate warm color light in family or hotel) capture of emitting light having color temperature of 2700K, or incandescent light source (may simulate a projection lamp in showroom) capture of emitting light having color temperature of 2856K.

Each light source 130 may emit visible light having different color temperature, such as visible light having color temperature ranging between 2700K and 7500K or other range. In addition, another light source 140 is disposed on a central position of the lamp house 120 and may emit invisible light, for example, ultraviolet light source.

The light sources 130 may be point-type light source or line-type light source. At least one of the light sources 130 may be point-type light source, and the other may be line-type light source. For example, the light sources 130 may include a first light source 131, a second light source 132, a third light source 133, a fourth light source 134, a fifth light source 135 and a sixth light source 136, wherein the first light source 131, the second light source 132, the fourth light source 134 and the fifth light source 135 are line-type light sources, and the third light source 133 and the sixth light source 136 are point-type light sources.

In addition, each light source 130 includes a plurality of light-emitting components symmetrically arranged. For example, the first light source 131 includes a plurality of light-emitting components 1311 symmetrically arranged with respect to the central position of the lamp house 120. Since the light-emitting components 1311 of each light source 130 are symmetrically arranged, a homogeneity of the illumination may be increased.

The feedback controlling module 160 includes a light sensor 161, a feedback controller 162 and an illumination homogeneity calculator 163, wherein the light sensor 161 may be disposed within the close space S1 and detect an illumination of light L1 emitted by the light-emitting component of the light source 130. The feedback controller 162 may control at least one of the light sources 130 to emit the light, and the illumination homogeneity calculator 163 may determine a region according the illumination detecting signal from the light sensor 161, wherein the region is covered by a specific homogeneity of the illumination. The feedback controller 162 may control a stability of the illumination. In addition, the feedback controller 162 and/or the illumination homogeneity calculator 163 may be semiconductor circuit, software and/or firmware, and the feedback controller 162 and the illumination homogeneity calculator 163 may be integrated together or disposed separately. In addition, the feedback controller 162 and the illumination homogeneity calculator 163 may be disposed on desktop, server, notebook or other kind of electronic device.

In step S120, the illumination homogeneity calculator 163 may determine the region R1, wherein the inhomogeneity of the illumination of the light L1 emitted by the light-emitting components of the light source 130 is less than a second predetermined ratio. The second predetermined ratio is about 1% or other suitable value.

Figure 4A:
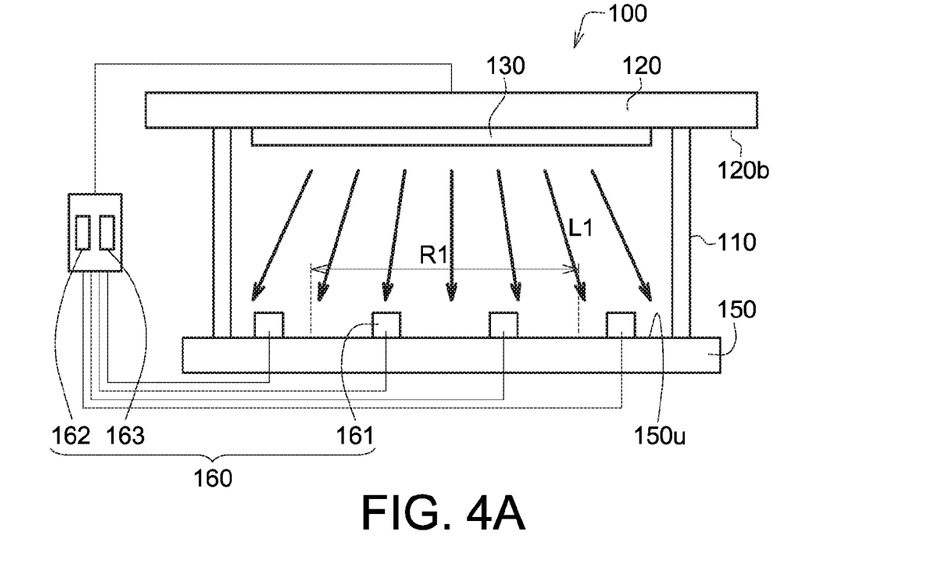
FIG. 4A is a diagram of the region determined by the measuring device of FIG. 2.
Figure 4B:
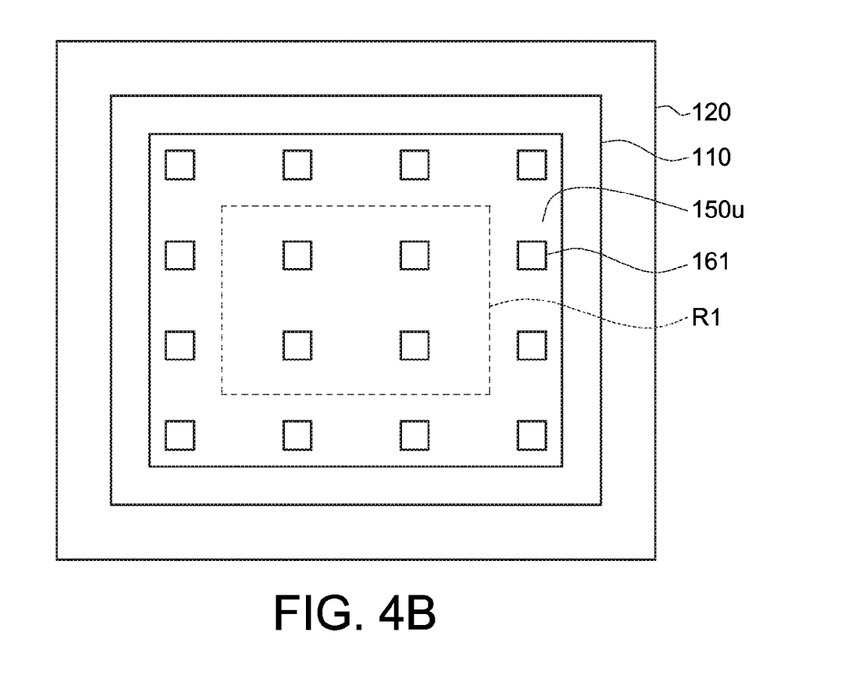
FIG. 4B is a top view (the lamp house and the light sources are not shown) of the measuring device of FIG. 4A.

For example, as shown in FIGS. 4A and 4B. FIG. 4A is a diagram of the region R1 determined by the measuring device 100 of FIG. 2, and FIG. 4B is a top view (the lamp house 120 and the light sources 130 are not shown) of the measuring device 100 of FIG. 4A. The light sensors 161 are disposed on the carrier 150 and arranged in array, and the light sensors 161 may be electrically connected to the illumination homogeneity calculator 163. Then, each light sensor 161 transmits the detected illumination detecting signal of the light L1 to the illumination homogeneity calculator 163. The illumination homogeneity calculator 163 calculates an area of the region R1 according to the illumination detecting signal of the light sensor 161, wherein the inhomogeneity $M_{av}$ of the illumination is less than the second predetermined ratio.

The inhomogeneity $M_{av}$ may be calculated by the following formula (1). In formula (1), $M_{max}$ represents a maximum illumination within the region R1, and $M_{min}$ represents a minimum illumination within the region R1.

$$M_{av} = \frac{M_{max} - M_{min}}{M_{max} + M_{min}} \quad (1)$$

In step S130, the feedback controlling module 160 may control the illumination of the light L1 emitted by the light source 130 using feedback control method, such that an instability of the illumination is less than a first predetermined ratio for increasing accuracy of the property of the photovoltaic device measured by the measuring device 100. The term "accuracy" means the property curve measured by the measuring device 100 of the present disclosure can accurately show the inherent property of the photovoltaic device 10.

Figure 5A:
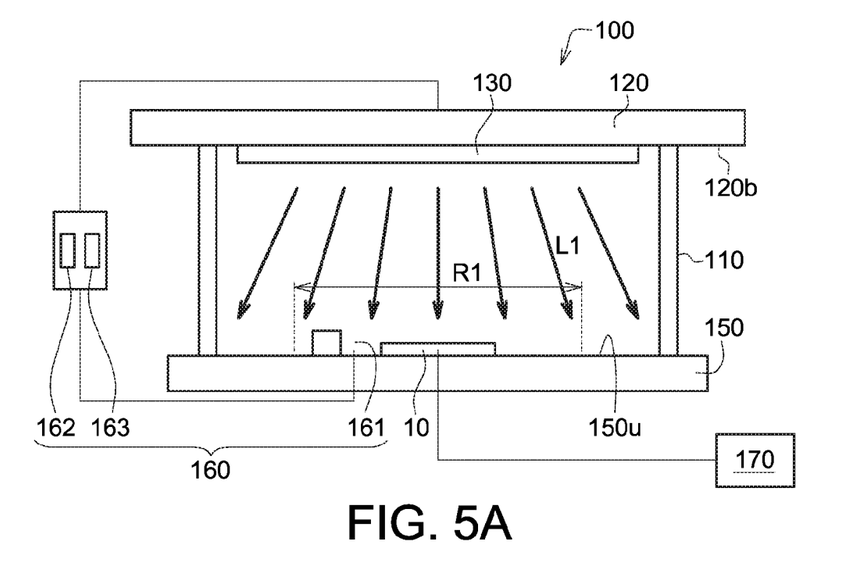
FIG. 5A is a diagram of controlling illumination of the light source using the measuring device of FIG. 2.
Figure 5B:
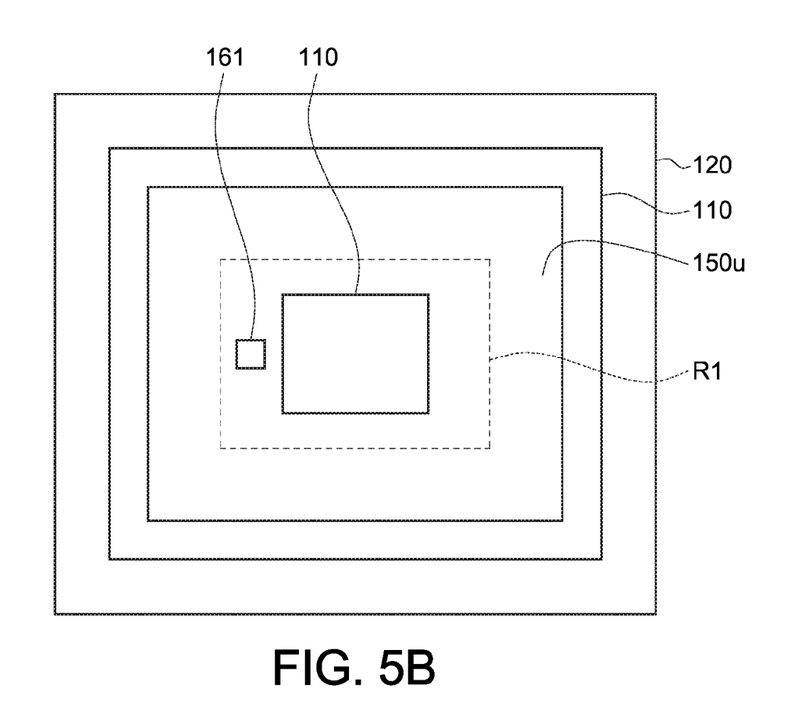
FIG. 5B is a top view of (the lamp house and the light sources are not shown) of the measuring device of FIG. 5A.

FIG. 5A is a diagram of controlling illumination of the light source 130 using the measuring device 100 of FIG. 2, and FIG. 5B is a top view of (the lamp house 120 and the light sources 130 are not shown) of the measuring device 100 of FIG. 5A. In the present step, the photovoltaic device 10 and the light sensor 161 are disposed within region R1. Since the inhomogeneity $M_{av}$ within the region R1 is less than the second predetermined ratio, the accuracy of the property of the photovoltaic device 10 measured by the measurement unit 170 may be increased.

Figure 6:
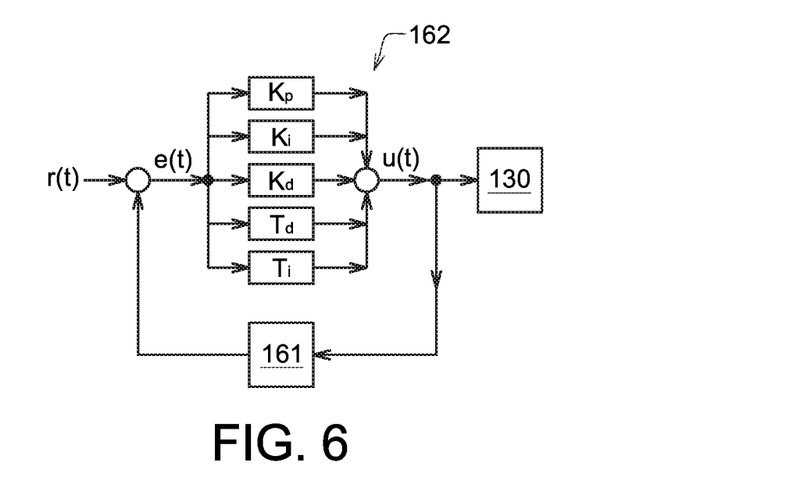
FIG. 6 is a diagram of functional blocks of the feedback controller of FIG. 2.

FIG. 6 is a diagram of functional blocks of the feedback controller 162 of FIG. 2. The feedback controller 162 may control the instability of the illumination of the light L1 emitted by the light-emitting components is less than a first predetermined ratio for increasing the accuracy of the property of the photovoltaic device 10 measured by the measurement unit 170, wherein the first predetermined ratio is about 1% or other suitable value, for example.

In the present embodiment, the feedback controller 162 is, for example, a proportional-integral-differential (PID) controller which includes a proportional unit, an integral unit and a differential unit, wherein the proportional unit, the integral unit and the differential unit are set by parameters $K_p$, $K_i$ and $K_d$ respectively. In the present embodiment, the feedback controller 162 is a 5-parameters PID controller. For example, the feedback controller 162 includes parameters $K_p$, $K_i$, $K_d$, $T_d$ and $T_i$, wherein the parameter $$T_d = \frac{K_d}{K_p}, \text{ and } T_i = \frac{K_p}{K_i}.$$

The feedback controller 162 of FIG. 6 may generate a signal u(t) to control the illumination of the light emitted by the light source 130, wherein the signal u(t), the error signal e(t) and 5-parameters may be represented by the following formula (2).

$$u(t) = K_p\left(e(t) + T_d\frac{de(t)}{dt} + \frac{1}{T_i}\int e(t)dt\right) \quad (2)$$

Due to the design of 5-parameters, the instability of the illumination of the light L1 may be reduced. As a result, the sensing error of the light sensor 161 may be compensated. Furthermore, in general, the light sensor 161 has inevitable sensing error, and the less the sensing error is, the more complicate the circuit design is and the higher the cost is. On the contrary, the larger the sensing error is, the less complicate the circuit design is and the lower the cost is. Since the measuring device 100 controls the instability of the illumination to be less than a predetermined ratio by the feedback control, the accuracy of the measured property of the photovoltaic device 10 can be maintained in allowed error range even if the light sensor 161 has a large sensing error.

Figure 7:
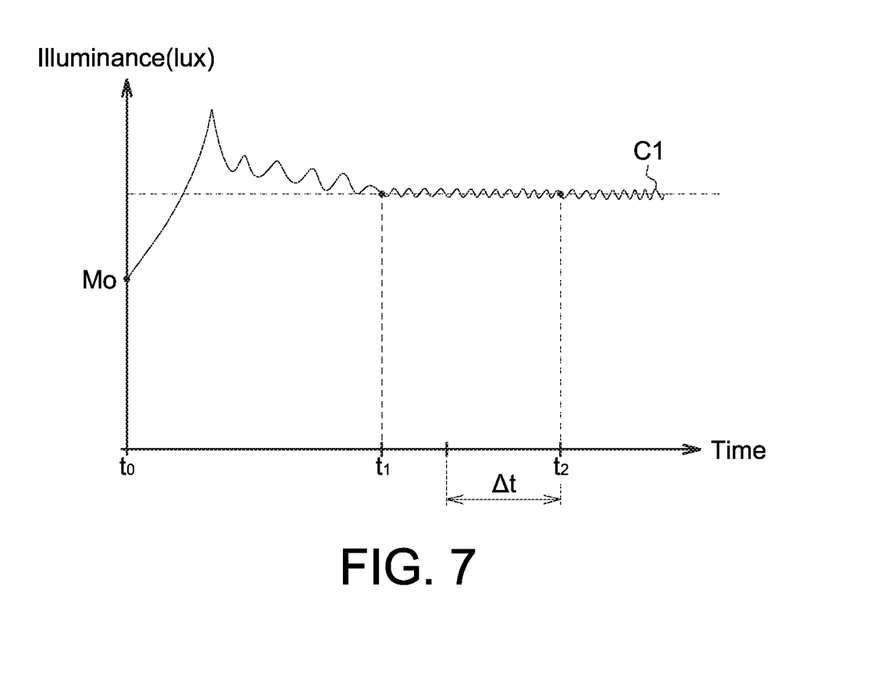
FIG. 7 is a changing diagram of the illumination of the light emitted by the light source of FIG. 5A.

FIG. 7 is a changing diagram of the illumination of the light emitted by the light source 130 of FIG. 5A. A curve C1 represents the changing of the illumination of the light L1 over the time. In time $t_0$, r(t) is an initial value inputting the feedback controller 162, such that the light source 130 emits the light L1 having an initial illumination $M_0$. Since the feedback controller 162 continues to receive the illumination detecting signal from the light sensor 161, and accordingly the feedback controller 162 can control the illumination of the light L1 to change toward stability according to the latest illumination detecting signal by using feedback control. For example, under the feedback control, the illumination of the light L1 is getting stable from time $t_0$ to time $t_1$. In one embodiment, the period from time $t_0$ to time $t_1$ is about 20 minutes to about 30 minutes. Under feedback control, after time $t_1$, the instability $M_t$ of the illumination is less than the first predetermined ratio, and accordingly the accuracy of the property of the photovoltaic device 10 measured by the measurement unit 170 can be increased.

The instability Mt of the illumination of the present disclosure may be represented by the following formula (3).

In formula (3), $S_d$ represents a standard deviation of the illumination within the region R1 during a time period, and $M_a$ represents an average of the illumination within the region R1 during the time period. For example, at time $t_2$, the instability $M_t$ is a ratio value of the standard deviation $S_d$ to the average $M_a$ during the time period $\Delta t$, wherein the time period $\Delta t$ traces back to a time interval ago from time $t_2$. The time period $\Delta t$ may be about 10 minutes or other arbitrary time period.

$$M_t = \frac{S_d}{M_a} \quad (3)$$

Since the measuring device 100 of the present disclosure automatically adjusts the illumination of the light L1 emitted by the light source 130 by using the feedback control, and accordingly manual adjustment for the illumination of the light L1 is not needed, and the distance between the photovoltaic device 10 and the light sources 130 is not needed to be adjusted for the illumination of the light L1.

In step S140, the feedback controller 162 determines whether the instability $M_t$ is less than the first predetermined ratio. If the instability $M_t$ is less than the first predetermined ratio, the step S150 is performed. If the instability $M_t$ is not less than the first predetermined ratio, the process goes back the step S130 until the instability $M_t$ is controlled to be less than the first predetermined ratio.

In step S150, the measurement unit 170 measures the property of the photovoltaic device 10 under the instability $M_t$ being less than the first predetermined ratio, wherein the property is the property curve of voltage and current, the property curve of illumination and short circuit current or the property curve of temperature and fill factor, for example.

Figure 8:
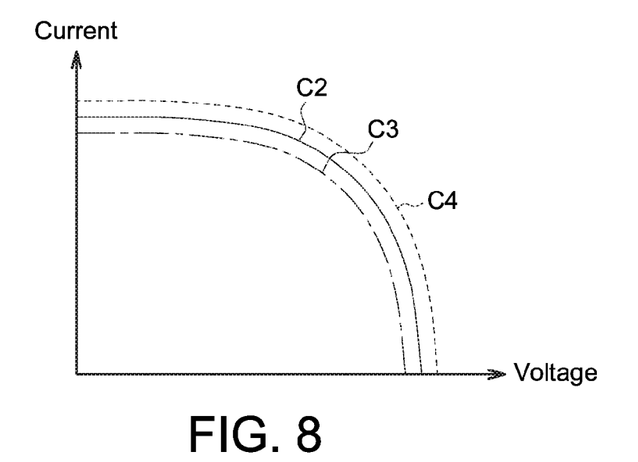
FIG. 8 is a diagram of the property curve of voltage and current of the photovoltaic device of FIG. 5A.

FIG. 8 is a diagram of the property curve of voltage and current of the photovoltaic device 10 of FIG. 5A. A curve C2 represents the property curve of the voltage and current of the photovoltaic device 10 measured by the measuring device 100 of FIG. 5A. Due to the design of the measuring device 100, the instability of the illumination of the light L1 may be less than the first predetermined ratio and/or the inhomogeneity of the illumination may be less than the second predetermined ratio, and accordingly several curves measured in different time (for example, different measuring batches) substantially overlap, as the shown curve C2. In contrast, if the instability of the illumination of the light L1 is larger than the first predetermined ratio and/or the inhomogeneity of the illumination is larger than the second predetermined ratio, several curves measured in different time do not overlap. For example, the curve C3 measured at a time does not overlap a different curve C4 measured at different time.

Figure 9:
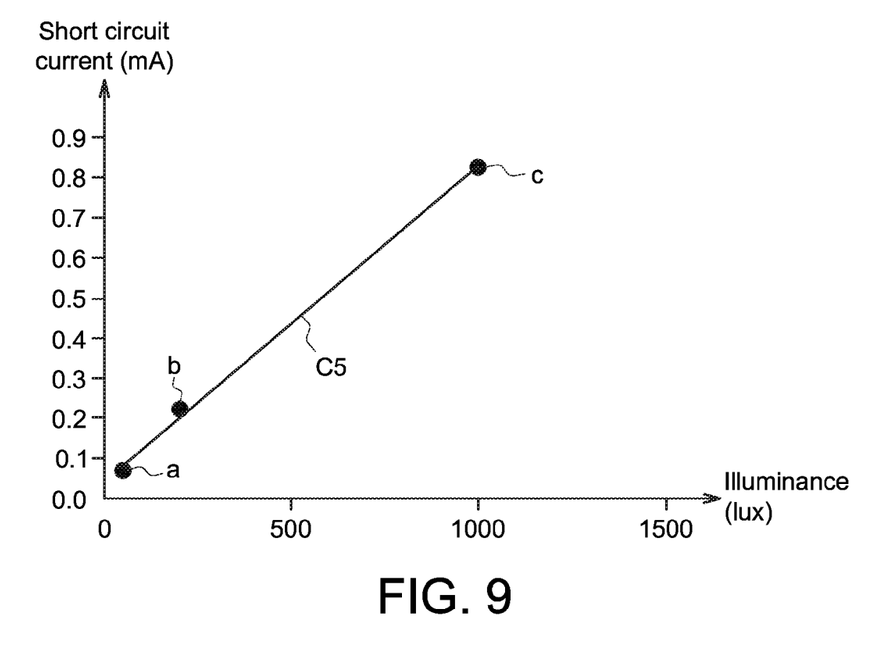
FIG. 9 is a diagram of the property curve of illumination and short circuit current (Isc) of the photovoltaic device of FIG. 5A.

FIG. 9 is a diagram of the property curve of illumination and short circuit current (Isc) of the photovoltaic device 10 of FIG. 5A. Points a, b and c of FIG. 9 are property points measured by the measuring device 100 of FIG. 5A. The points a, b and c represent the short circuit current changes over the illumination under the same temperature. Under different illumination, the short circuit current of each point is different. For example, in the point a, the short circuit current of the photovoltaic device 10 is about 0.08 mA under the 50 lux of the illumination of the light L1; in the point b, the short circuit current of the photovoltaic device 10 is about 0.21 mA under the 200 lux of the illumination of the light L1; in the point c, the short circuit current of the photovoltaic device 10 is about 0.83 mA under the 1000 lux of the illumination of the light L1. Through mathematical method of polynomial curve fitting, a linear equation C5 may be obtained, wherein the linear equation C5 of the points a, b and c may be regarded as the property curve of illumination and short circuit current of the photovoltaic device 10.

In another embodiment, the carrier 150 of FIG. 5A may be a temperature controlling plate. For example, the carrier 150 includes a heater and a cooler, and the temperature of the photovoltaic device 10 may be controlled by the heater and the cooler. The carrier 150 may control the temperature of the photovoltaic device 10 to maintain in a temperature value or change to another temperature value.

Through the temperature control of the carrier 150, the property curve of temperature and fill factor of the photovoltaic device 10 may be obtained. The following description is made with reference to the accompanying FIG. 10.

Figure 10:
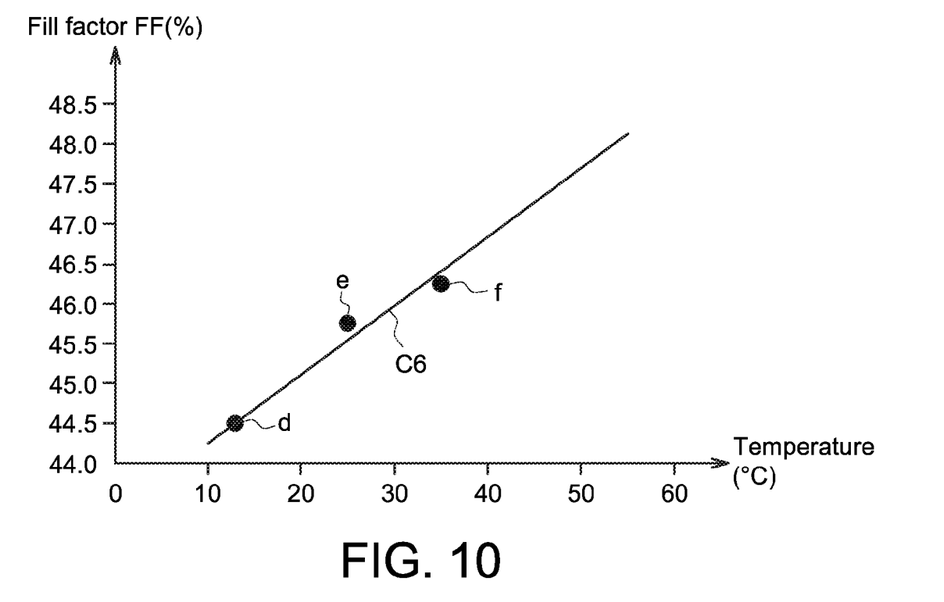
FIG. 10 is a diagram of the property curve of temperature and fill factor of the photovoltaic device of FIG. 5A.

FIG. 10 is a diagram of the property curve of temperature and fill factor of the photovoltaic device 10 of FIG. 5A. Points d, e and f of FIG. 10 are property points measured by the measuring device 100 of FIG. 5A. The points d, e and f represent the fill factor FF of the photovoltaic device 10 changes over the temperature under the same light source 130 and the same illumination. Under different temperatures, the fill factor FF of each point is different. For example, in the point d, the fill factor FF of the photovoltaic device 10 is about 44.5% under 15 degrees Celsius; in the point e, the fill factor FF of the photovoltaic device 10 is about 45.7% under 26 degrees Celsius; in the point f, the fill factor of the photovoltaic device 10 is about 46.2% under 35 degrees Celsius. Through mathematical method of polynomial curve fitting, a linear equation C6 of the points d, e and f may be obtained, wherein the linear equation C6 may be regarded as the property curve of temperature and fill factor of the photovoltaic device 10.

During the step S150 performing, the feedback controller 162, by using the feedback control, continues to control the instability $M_t$ to be within the first predetermined ratio for maintaining the accuracy of the measured property of the photovoltaic device 10.

As described above, since the measuring device of the present embodiment of the present disclosure automatically controls the illumination of the light emitted by the light source by using the feedback control, and accordingly manual adjustment for the illumination of the light is not needed, the distance between the photovoltaic device and the light sources is not needed to be adjusted for the illumination of the light, and the accuracy of the measured property of the photovoltaic device may be increased.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A measuring device configured to measure a property of a photovoltaic device, comprising:
    plural kinds of light sources each having different light color, wherein each kind of light source comprises a plurality of light-emitting components symmetrically arranged;
    a feedback controlling module configured to control illumination of light emitted by the light sources and determine whether any instability of the illumination is less than a first predetermined ratio; and
    a measurement unit, configured to measure the property of the photovoltaic advice under illumination if the instability of the illumination is less than the first predetermined ratio.

2. The measuring device according to claim 1, wherein the first predetermined ratio is 1%.

3. The measuring device according to claim 1, wherein the feedback controlling module comprises:
    a feedback controller; and
    a light sensor configured to detect the illumination of the light.

4. The measuring device according to claim 1, wherein the feedback controller comprises a proportional-integral-derivative (PID) controller.

5. The measuring device according to claim 4, wherein the quantity of parameters of the PID controller are five.

6. The measuring device according to claim 1, wherein the photovoltaic device is located beneath a region of the light sources, and an Inhomogeneity of the illumination within the region is less than a second predetermined ratio.

7. The measuring device according to claim 6, wherein second predetermined ratio is 1%.

8. The measuring device according to claim 1, further comprises:
    a lamp house on which the light sources are disposed;
    a carrier configured to detect the photovoltaic device; and
    an accommodating portion located between the lamp house and the carrier and configured to accommodate the light sources and the photovoltaic device.

9. The measuring device according to claim 8, wherein the carrier comprises a temperature controlling plate.

10. A method configured to measure a property of a photovoltaic device, comprising:
    providing plural kinds of light sources having different light colors, wherein each kind of light source comprises a plurality of light-emitting components symmetrically arranged;
    controlling, by a feedback controlling module, illumination of light emitted by the light sources;
    determining, by the feedback controlling module, whether any instability of the illumination is less than a first predetermined ratio; and
    if the instability is less than the first predetermined ratio, measuring, by a measurement unit, the property of the photovoltaic device under the illumination.

11. The method according to claim 10, wherein the first predetermined ratio is 1%.

12. The method according to claim 10, further comprising:
    determining a region, wherein an inhomogeneity of the illumination within the region is less than a second predetermined ratio;
    wherein in the step of measuring the property of the photovoltaic device under the illumination, the photovoltaic device is located at the region.

13. The method according to claim 12, wherein the second predetermined ratio is 1%.

14. The method according to claim 10, wherein the feedback controlling module comprises:
    a feedback controller; and
    a light sensor configured to detect the illumination of the light.

15. The method according to claim 14, wherein the feedback controller comprises a PID controller.

16. The method according to claim 15, wherein the quantity of parameters of the PID controller are five.

* * * * *